Patented Aug. 26, 1947

2,426,215

UNITED STATES PATENT OFFICE 2,426,215

THERMOPLASTIC SYNTHETIC RESIN OPTICAL LAP

Lester M. Hicks, Rochester, N. Y., assignor to Eastman Kodak Company, Rochester, N. Y., a corporation of New Jersey No Drawing. Application November 11, 1944, Serial No. 563,025

4 Claims. (Cl. 51—298)

The present invention relates to an abrading lap and the method of making the same, and particularly to an abrading lap for grinding and polishing optical surfaces on solid optical material and a method of abrading resulting from the use thereof.

In my copending patent application, Serial No. 563,024 filed on even date herewith I pointed out the great advantages, so far as saving of time and material, that the use of cellulose derivative molding composition for abrading laps presented over the use of conventional "pitch" or cast-iron "shells" for the same purpose. Inasmuch as cellulose derivative plastics were found to possess characteristics which made them so adaptable and desirable for use in abrading laps it occurred to me that the thermoplastic synthetic resin molding compounds which have about the same desirable characteristics as the cellulose derivative plastics should also be adapted to this use. Subsequent experiments with available thermoplastic synthetic resin molding compositions have indicated that this conclusion was well founded.

Accordingly, one object of the present invention is the provision of an abrading lap for optical surfaces which has a working face of, or is entirely made of, a thermoplastic synthetic resin molding compound.

Another object is to make the cast-iron "shells" heretofore used in fine grinding optical surfaces, from a thermoplastic synthetic resin molding compound, or at least make the working face of such "shells" of this thermoplastic material.

And yet another object is to provide an abrading lap of a thermoplastic synthetic resin molding which revolutionizes the grinding and polishing technique heretofore practiced in the production of polished optical surfaces.

Another object is to carry out the abrading operation on a piece of work at high speed (relative rotational speed between the work and lap of 200 R. P. M. or more) using a lap of the type set forth above.

And in conclusion, an object of the present invention is to provide an abrading lap of a thermoplastic synthetic resin molding compound which has all of the advantages set forth in my above noted copending application for a lap made of cellulose derivative molding composition plus other advantages, the added advantages including less susceptibility to water and less shrinkage on cooling after being molded as well as greater chemical resistance.

The novel features that I consider characteristic of my invention are set forth with particularity in the appended claims. The invention itself, however, both as to its organization and its methods of operation, together with additional objects and advantages thereof will best be understood from the following description of specific embodiments of the present invention.

In my above noted copending patent application I described in great detail the prior art technique used in finishing optical surfaces and how the technique can be revolutionized to result in a great saving in polishing time and the cost of material per lens by the use of a cellulose derivative molding composition in the place of the iron "shell" and "pitch" laps used in fine grinding and polishing, respectively. It was pointed out that because of the resistance to flow and distortion possessed by cellulose derivative plastics that when used as polishing laps instead of conventional "pitches" that higher operating speeds and pressures were capable of being used and that the working surface of the lap could be made exactly complementary to the curve finally desired so that the work is brought to the curve of the lap rather than vice versa as is the usual technique. Despite the fact that these cellulose derivative plastics have a desired high resistance to flow and distortion they did not tend to scratch or otherwise blemish the optical surface being worked.

I have found thermoplastic synthetic resin molding compounds to possess all of the desirable characteristics which make cellulose derivative plastics so desirable for abrading laps used for cold working optical surfaces and that these compounds can be substituted for conventional "pitch" polishers and the cast-iron "shell" used in fine grinding to obtain the same startling results as I found in connection with the use of cellulose derivative plastics for these abrading laps. These synthetic resin compounds have softening tendencies well above that of "pitch" and comparable to those of cellulose derivative plastics so that they will withstand temperatures and pressure combinations incident to grinding and polishing operations at high speeds and which a "pitch" lap will not stand without flowing out of control. What is also important is that the softening temperature of these synthetic resin compounds can be varied by different means, such as altering the time and character of polymerization, so that a compound having the desired flow and hardness characteristics for different jobs can be obtained.

The field of synthetic resin plastics includes a great many different modifications and types of basic resin materials and the present invention is limited to those compounds which are thermoplastic in nature rather than including those that are thermosetting. Because of their extreme hardness, along with the fact that no procedures are known for producing varying degrees of flow in thermosetting plastic materials, thermosetting materials are at present believed to be of no practical value and have not been investigated so far as their use in abrading laps is concerned.

Most of the many thermoplastic synthetic resin compounds are derived from styrenes, acrylic resin, or vinyl resin base compounds. Polyvinylidene chloride, a newcomer in the plastic field commercially known as Saran, is a rather special type of plastic. For purposes of investigation I have, therefore, chosen the following materials as being generally representative of all thermoplastic synthetic resin compounds which would be suitable for use as abrading laps.

Loalin No. 1, Catalin Corp., N. Y., a polystyrene material.

Rolled Lucite (crystal-methyl methacrylate), E. I. du Pont de Nemours and Co., Arlington, N. J., an acrylic resin derivative.

Polyvinyl Acetate, RH–407, E. I. du Pont de Nemours, Arlington, N. J., a vinyl resin derivative.

Saran (polyvinylidene chloride), Dow Chemical Co., Midland, Mich.

These materials were obtained in powdered or granular form and molded into laps in the same manner as set forth in my noted copending application for forming the laps of cellulose derivative plastic. For example, the powder was heated in an oven above the softening point specified by the manufacturer, then placed on a metal "shell" heated above this temperature, and then pressed with a cold forming tool which had a face the curve of which would produce a polisher which would give the desired test on the lens surface to be polished. The shrinkage characteristics of the plastic material may or may not have to be compensated for depending upon the test tolerance and the type of plastic used. The cold forming tool chills the particles of powder on the working face of the lap to give the desired roughened surface, while the layer of powder or granules adjacent the hot "shell" becomes completely fused and sticks the lap to the "shell." As set forth in connection with the disclosure in my noted copending application, a roughened working surface is desired on the lap since it has been found to be conducive to a more rapid polishing action.

The above listed examples of thermoplastic synthetic resin molding compounds were made into polishing laps and tested against a conventional "pitch" polishing lap under normal conditions of operation in order to determine how the polishing rate of these materials compared with one another and with the "pitch" lap, and also to determine if these materials could stand high-speed operating conditions. The results of this test are shown in the following table. It is also noted that the machine used, the lens being polished, and all the other operating conditions of this test are exactly the same as those under which the data for cellulose derivative plastic laps was obtained, and which data is set forth in Table I of my above-noted copending patent application. Accordingly, the results obtained for thermoplastic synthetic molding compounds and shown in the following table can be directly compared with those given in Table I of my copending application relating to cellulose derivative plastic laps.

[Abrasive—Rhodes 487 (rouge and water). Operating temperature 76–78° F.]

| Material | Spindle Speed 132 R. P. M. | | Spindle Speed 600 R. P. M. | |
|---|---|---|---|---|
| | Surface Temp., °F. | Polishing Time, min. | Surface Temp., °F. | Polishing Time, min. |
| Polystyrene | 95–105 | 95–105 | 130–135 | 10–11 |
| Lucite (Methyl Methacrylate) | 95–100 | (¹) | 135 | (¹) 12–13 |
| Polyvinyl acetate | 90–95 | 120 | 128–132 | |
| Saran (polyvinylidene) chloride | 95 | 80–90 | 130–140 | 11–12 |
| Pitch (specified for job) | 85–90 | 210–225 | Polisher became too soft; could not be used. | |

¹ The methyl methacrylate material (both powdered and granular form) had a tendency to leave a surface film on the fine ground surface which retarded polishing. Continued polishing at 132 R. P. M. showed a gradual decrease of this film. After 70–80 minutes it was removed completely and then polishing continued at the expected rate. An overall time of 155 minutes was required to polish out the surface of this lap, but this time included the 70–80 minutes necessary to get by the film-forming state. At the highest spindle speed approximately 8 minutes was required to remove this film, and another 10–12 minutes were required for complete polishing. The methyl methacrylate used in this test was a standard commercial product bought on the open market is not one particularly formulated to this type of work. It is believed that if the manufacturer was aware of this intended use of this material and the noted difficulty encountered by the use thereof that the formula of the composition could be varied to eliminate this difficulty. I further believe that this surface film could probably be broken by the addition of a suitable chemical to the abrasive mixture and that this material would then polish as rapidly as the other synthetic resin compounds tried. Despite the surface film trouble, however, at the higher spindle speed, this material resulted in a polishing time that is substantially less than that obtainable with "pitch" laps at the highest spindle speeds they are capable of withstanding.

The variation in results at the 132 R. P. M. spindle speed is probably due to the particle size and the hardness of the materials used. Their individual shrinkage characteristics probably made the molding of one type more accurate than another and this would affect the polishing time. It will be noted from the data given in my copending patent application that the powdered form of cellulose derivative plastics produce a shorter polishing cycle than the granular form of the same material, although the reason for the discrepancy is not known. It is pointed out that all of the synthetic resin compounds tried were those commercially available on the war priority restricted market with no regard to flow or hardness characteristics. It is believed that if all of the resins had been in the same form and of the same softening temperature, similar results would have been obtained for all materials.

It is interesting to note, however, that at the higher spindle speed the polishing times of the several materials are very uniform and are almost identical with the polishing times found for cellulose derivative plastic laps operated at the same spindle speed (see Table I of my above-noted copending application). Only two reasons can be given at this time why the polishing times for several materials at the higher speeds are uniform whereas they are not at the slower speeds. First, the same laps were used in the higher speed run that were used in the lower speed run and, consequently, any discrepancy in the curvature of the original formed lap which might have occurred due to different shrinkage characteristics of the several materials would probably be reduced or eliminated by a wearing in of the lap on the slower run. The second, and more plausible, reason is that the test of the surface was observed more closely on the higher speed run than on the slower speed run, being taken about every two minutes on the high speed run as compared with every twenty minutes on the slow speed run, with the result that in the higher speed run the surface probably never got as far from test as in the slower speed run. As is well known in the art, the farther an optical surface gets from test during polishing the longer it takes to polish it back to test. As fully set forth in my noted copending application, with conventional "pitch" laps which are soft, this control of test is generally made by cutting away the surface of the lap, while with thermoplastic synthetic resin laps, which are comparatively hard and are molded to the desired shape, this cutting procedure is not recommended, but control of test is accomplished by shifting the length of "swing" of the lap and/or varying the "weight" on the lap. Test checks were made more frequently during the higher speed run because this speed was expected to cause a more rapid change of test due to the more rapid polishing action derived by its use.

From a practical point of view, all of these thermoplastic synthetic resin compounds, except polyvinyl acetate, produced some stripes and the methyl methacrylate material produced scratches. This was undoubtedly due to the extreme hardness of these resins. As set forth in my above-noted copending patent application this trouble was also encountered with the cellulose derivative plastics when too hard a composition was used. As pointed out previously, these resin samples were commercially available molding powders which were known to be too hard for polishing purposes, but they were all that were available on the market now restricted by war priorities. These materials could undoubtedly be produced with lower softening temperatures, but at the present time it is impossible to purchase these materials in different flow characteristics and there was no means at my disposal for conducting the necessary research in connection with the synthetic resin as there was with cellulose derivative plastics.

From the results obtained with the materials available, however, it is reasonable to assume that these thermoplastic synthetic resin molding compounds possess the same potential possibilities as the cellulose derivative plastics so far as their use as abrading laps is concerned. Polystyrene appears to have certain characteristics which make it particularly desirable for use as an abrading lap and more desirable than the cellulose derivative plastics. A particular advantage of polystyrene is the low shrinkage that occurs in this material on cooling after molding. This characteristic would greatly facilitate the molding of the working face on the lap to a curvature which was the exact complement of that desired on the work. In addition, polystyrene shows substantially no water absorption, or water susceptibility. Where rouge and water is used as an abrasive medium, a lap made from a material having low water susceptibility will show longer life than one which has a higher water susceptibility.

The polishing lap may be made by adhering a layer of thermoplastic synthetic resin molding compound to an iron "shell" as in the procedure in making conventional "pitch" laps, or the entire lap may be made of the resin material thus replacing or eliminating the need for the iron "shell." In this case, the plastic would have a suitable bearing insert molded into it, or mechanically affixed thereto, to form the necessary bearing connection for connecting the lap to the drive spindle therefor. This idea is completely disclosed in detail in my noted copending patent application and needs no further explanation herein.

In my noted copending patent application I pointed out in detail how and why the use of a cellulose derivative plastic lap in the fine grinding operation resulted in a decrease in the final polishing time of a given optical surface. The main reason advanced for this was that the cellulose derivative plastic lap when used in fine grinding did not leave the "gray" surface on the glass which is characteristic of a cast-iron fine grinding "shell" no matter how long the grinding continues. The removal of the "gray" surface made it possible to use a test plate on the surface being worked, rather than a spherometer, and eliminated the polishing time required to remove this "gray." The thermoplastic synthetic resin molding compounds mentioned would give the same desired advantages as cellulose derivative plastics when used as a fine grinding lap instead of a cast-iron "shell," and in combination with a resin polishing lap will give the phenominal reduction in polishing time noted for a cellulose derivative plastic lap.

As set forth in my noted copending application, a roughened surface on the working face of the polishing lap is conducive to more rapid polishing and it can be obtained on thermoplastic synthetic resin laps in the manner set forth in said application in connection with cellulose derivative laps for the reason that these two classes of molding compositions possess substantially the same molding characteristics. For instance, a chilled forming die for the working face of the lap may be used so as to freeze the surface particles of the composition in their powdered or granular form; a forming die having a rough face may be used; or layers of compatible molding compositions of two different softening temperatures may be used, the material having the higher softening point being exposed and having the working surface formed therein.

Thermoplastic synthetic resin molding compounds have physical characteristics comparable to cellulose derivative molding compositions which render the same adaptable for use as polishing laps on grinding machines of the curve generator type as set forth in my above-noted copending patent application. These machines are distinguished from conventional grinding and polishing machines in that the work and polishing spindles are rigid and are both power-driven at comparatively high speeds. Due to this high speed operation, these machines have heretofore been used only for grinding purposes, using conventional annular diamond, emery, or other abrasive tools, which abrade by benefit of a breakdown action. Thermoplastic synthetic resin molding compounds have sufficient rigidity and resistance to flow when molded into an annular tool for a machine of this type to withstand the high speed operation thereof and function properly as a polishing lap for an optical surface. Heretofore grinding machines of the curve generator type have never been used for polishing purposes, because of the lack of a lap which was sufficiently rigid to withstand the operational speed thereof and at the same time not scratch or otherwise injure the glass surface being abraded.

From the above description it will be apparent that the use of thermoplastic synthetic resin compounds in abrading laps for glass surfaces instead of "pitch" and/or cast-iron "shell" will result in the unexpected and phenominal saving in overall polishing-out time for a given optical surface claimed in my noted copending patent application for cellulose derivative laps. But in addition they also possess other advantages inherent in the material due to its thermoplastic characteristics. These advantages include reproducibility in composition and desirable physical characteristics in a lap day in and day out; the ability to reuse worn out laps over again by melting them up without altering the desired physical characteristics of the material; and the salvage of scrap material resulting from fabrication of the laps and/or machining the working surface thereof.

I am aware that polystyrene has been suggested for use as the bonding agent for abrasive particles in the manufacture of abrasive wheels, but I do not believe that this use suggests or anticipates the use of this material or any other thermoplastic synthetic resin compound as an abrading lap of the type I am claiming.

In the first place, abrading wheels have the abrading material carried by them and the abrasive is rigidly held and moved over the surface of the work and gives a decided cutting action. Abrading wheels depend upon a breakdown of the bonding material for their abrading action, otherwise they would soon glaze over and become ineffective. Abrading members of this type are never used in polishing optical surfaces on glass because they would produce intolerable scratching and would not serve to reproduce a surface of the desired curvature because of their breakdown characteristics which would cause their configuration to change from a given one.

In the optical industry fine grinding and polishing is done by applying an abrasive mixture between the surface being worked and an abrading lap. These abrading laps differ from abrading wheels in that they do not carry the abrasive and give no abrasive action themselves. They merely serve to hold the abrasive mixture against the surface and cause it to be moved thereover in a curve defined by the working face of the lap. An abrading lap never breaks down as an abrading wheel has to do to be efficient, for if it did it would be useless.

It has been pointed out how a thermoplastic synthetic resin compound can be substituted for "pitch" in a polisher, for a cast-iron "shell" in fine grinding, or can be substituted for the grinding tool on a grinding machine of the curve generator type to adapt such a machine for high-speed polishing. In each instance, the plastic abrading tool is not relied upon to do any abrading itself but serves only to hold an abrasive medium on the surface to be worked and to move the abrasive over said surface in a defined curve. Accordingly, to distinguish the present invention from the use of abrading tools which incorporate the abrasive therein and break down in effecting the desired abrading action, I have referred to an abrading member constructed in accordance with the present invention as an abrading lap. Therefore, throughout the specification and claims where an abrading lap is referred to I mean an abrading member which requires the abrasive material to be applied between it and the work, and wherein the abrading member serves only to hold the abrasive, so applied, on the work and to move it thereover in a defined path, and as distinguished from an abrading tool in which the abrasive is directly incorporated in the tool and the tool must break down as the abrading action progresses. The term abrading lap as used, therefore, excludes abrading tools such as diamond wheels, emery wheels, etc. or any tool in which the abrading action is derived solely from an abrasive bonded together to form a mass and which bonding material is capable of breaking down to continually present new abrasive particles to the work.

Although I have described certain specific embodiments of my invention, I am aware that many modifications thereof are possible. My invention, therefore, is not to be restricted to the precise details of the specific embodiments disclosed but is intended to cover all modifications coming within the scope of the appended claims.

Having thus described my invention, what I claim as new and desire to secure by Letters Patent of the United States is:

1. An abrading lap for the cold working of solid optical material for producing an optical surface thereon comprising a body of a thermoplastic resin molding compound having a working face corresponding in shape to the optical surface that is to be generated and in which the thermoplastic compound is one the base material of which is styrene.

2. An abrading lap for the cold working of solid optical material for producing an optical surface thereon comprising a body of a thermoplastic resin molding compound having a working face corresponding in shape to the optical surface that is to be generated and in which the thermoplastic compound is one the base material of which is a vinyl resin.

3. An abrading lap for the cold working of solid optical material for producing an optical surface thereon comprising a body of a thermoplastic resin molding compound having a working face corresponding in shape to the optical surface that is to be generated and in which the thermoplastic material is one the base material of which is polyvinylidene chloride.

4. An abrading lap for the cold working of solid optical material for producing an optical surface thereon comprising a body of a thermoplastic synthetic resin molding compound having a working face corresponding in shape to the optical surface that is to be generated and in which the thermoplastic compound is one, the base material of which is selected from the group consisting of polystyrenes, polyvinylidene chlorides, vinyl resins, and acrylic resins.

LESTER M. HICKS.

REFERENCES CITED

The following references are of record in the file of this patent:

UNITED STATES PATENTS

| Number | Name | Date |
|---|---|---|
| 1,697,609 | Pivin | Jan. 1, 1929 |
| 2,309,819 | Benner | Feb. 2, 1943 |
| 2,309,831 | Devol et al. | Feb. 2, 1943 |
| 2,354,091 | Sharpe et al. | July 18, 1944 |
| 369,431 | Brown | Sept. 6, 1887 |
| 2,352,178 | Bolsey | June 27, 1944 |
| 1,356,330 | Allen | Oct. 19, 1920 |

OTHER REFERENCES

Amateur Telescope Making, published by Scientific American Publishing Co., 1935.